No. 696,099. Patented Mar. 25, 1902.
M. W. HOLLINGSWORTH.
ARTIFICIAL TOOTH.
(Application filed July 1, 1901.)
(No Model.)
FIG. 1.
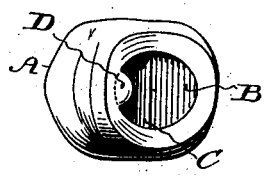
FIG. 3.  FIG. 2.  FIG. 5.
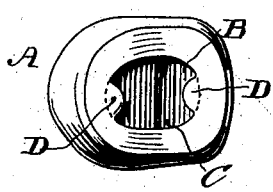 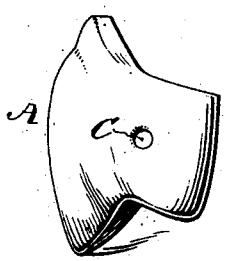 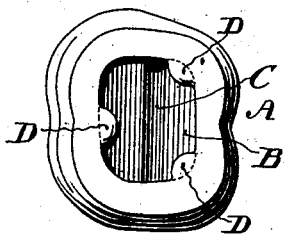
FIG. 4.  FIG. 6.
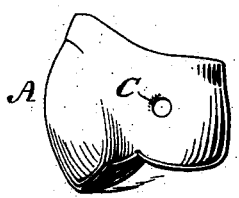 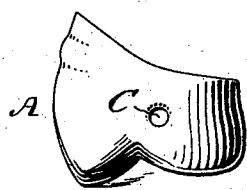
FIG. 7.
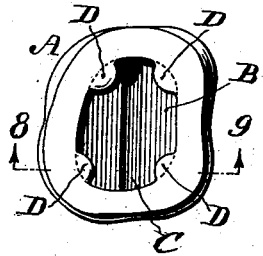
FIG. 8.  FIG. 9.
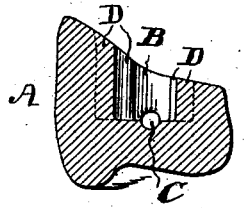 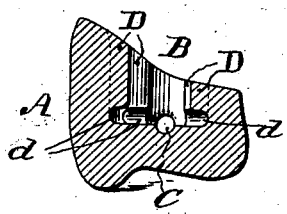
WITNESSES:  INVENTOR:
Banks F. Roush  Merrill W. Hollingsworth,
J. A. Neill  by Edward F. Simpson, Jr.
 Attorney
THE NORRIS PETERS CO., PHOTO-LITHO., WASHINGTON, D. C.

UNITED STATES PATENT OFFICE.

MERRILL WEIR HOLLINGSWORTH, OF PHILADELPHIA, PENNSYLVANIA, ASSIGNOR TO THE S. S. WHITE DENTAL MANUFACTURING COMPANY, OF PHILADELPHIA, PENNSYLVANIA.

ARTIFICIAL TOOTH.

SPECIFICATION forming part of Letters Patent No. 696,099, dated March 25, 1902.

Application filed July 1, 1901. Serial No. 66,633. (No model.)

*To all whom it may concern:*

Be it known that I, MERRILL WEIR HOLLINGSWORTH, a citizen of the United States, residing at Philadelphia, in the county of Philadelphia and State of Pennsylvania, have invented a certain new and useful Improvement in Artificial Teeth; and I do hereby declare the following to be a full, clear, and exact description of the invention, such as will enable others skilled in the art to which it appertains to make and use the same.

My invention relates to a certain improvement in that class of artificial teeth known as "diatoric" or pinless teeth. A characteristic feature of artificial teeth of this class is an opening or cavity formed in the tooth extending from the base thereof and designed to be filled with the material of which the plate to which the teeth are to be attached is composed. Various forms of such openings or cavities have been devised, but they are either not sufficiently undercut to provide the desired engagement between the plate material and the tooth or if they exhibit sufficient undercut are very difficult or expensive to manufacture.

The object of my invention is the production of a diatoric or pinless artificial tooth provided with an opening or cavity undercut to the requisite degree and which at the same time does not present any difficulties of manufacture. This I attain by forming on the tooth during the process of molding one or more lugs which project into the tooth-cavity and extend from the base of the tooth to the inner end of said cavity, the lugs being subsequently undercut by cutting away a portion thereof where they join the floor of the cavity, the cutting being done before the tooth is fired and while it is yet soft. As a result of this method one or more lugs project from the vertical walls of the cavity, with a space or undercut between each lug and the end or floor of said cavity. This formation in the finished tooth affords an exceedingly strong connection between the plate material and the tooth, for the reason that the plate material not only fills the tooth-cavity, but also enters the undercuts formed by the space or spaces between the lug or lugs and the end or floor of said cavity.

In the accompanying drawings, which represent, on an enlarged scale, a number of artificial teeth embodying my invention, Figure 1 is a view of a bicuspid tooth looking toward the base thereof and provided with one lug. Fig. 2 is a side view thereof. Fig. 3 is an end view of a molar tooth provided with two lugs, and Fig. 4 is a side view thereof. Fig. 5 is an end view of a molar tooth provided with three lugs, and Fig. 6 is a side view thereof. Fig. 7 is an end view of a molar tooth provided with four lugs. Figs. 8 and 9 are vertical sectional views of the molar tooth shown in Fig. 7, the sections being taken on the line 8 9 of said figure, Fig. 8 showing the tooth before the lugs are undercut and Fig. 9 showing the completed tooth.

A indicates the body of the tooth, B the opening or cavity therein for the entrance of the plate material and which extends a suitable distance into the tooth from its base, and C the usual vent-opening, which extends transversely through the tooth from side to side and opens into said cavity B. The lug or lugs, which are indicated at D, when first formed on the tooth by the molding process extend from the base end of the tooth to the end or floor of the cavity, as shown in Fig. 8. They are then partly cut away at and near the end or floor of the cavity by a suitable instrument while the tooth material is still soft. The undercuts thus formed are indicated at *d*, Fig. 9. With the exception of the lug or lugs the walls of the cavity are substantially parallel, smooth, and uninterrupted.

Any desired number of lugs may be employed, according to the size and character of the tooth. Fig. 1 represents a bicuspid tooth with but one lug. Fig. 3 represents a small molar tooth with two lugs, while Figs. 5 and 7 respectively represent larger molar teeth, the one having three lugs and the other four lugs. The number and relative disposition or location of the lug or lugs may be a matter of choice with the manufacturer, who, however, will be guided by the size, shape, and character of the tooth. The dispositions of the lug or lugs indicated in the drawings have been found in practice to be well adapted for the purpose intended.

My improved artificial tooth possesses certain advantages over artificial teeth of a like character heretofore devised. The plate material filling the entire tooth-cavity B and entering the spaces d, formed by the undercut lugs D, firmly embeds the tooth in the plate material and affords a close and strong union between the two, the tooth being insured against displacement from strains in all directions. Pinless artificial teeth which are not sufficiently undercut are liable to pull out from the plate material, whereas my improved undercut lugs effectually prevent the tooth from so pulling out of the plate. Instead of weakening the tooth the lugs give additional strength thereto without practically decreasing the amount of plate material in the tooth-cavity. The undercuts not being formed until after the tooth has been molded, the addition of the lugs to the cavity does not present any manufacturing difficulties nor require any complicated or expensive molds. In fact, the lugs may be formed by simply cutting the proper number of grooves upon the sides of the cavity-forming projections of the mold, and the teeth are delivered from the mold as easily as they would be were the lug-forming grooves not present in the mold. As the lugs are but slight projections on the walls of the tooth-cavity, they can be easily and quickly undercut by the "trimmer" when trimming the tooth with but one or two strokes of a suitable instrument before the tooth is fired without appreciably increasing the cost of production. I have thus produced an artificial pinless tooth provided with efficient means for attachment to dental plates by simple, practicable, and inexpensive manufacturing methods.

I claim as my invention—

1. An artificial tooth formed with a cavity extending into it from its base, and with one or more lugs projecting into said cavity at the base of the tooth, a space being formed between each lug and the end or floor of said cavity, the vertical walls of said cavity being substantially parallel, smooth and uninterrupted, with the exception of said lug or lugs, which project into said cavity beyond the vertical walls thereof, substantially as and for the purpose described.

2. An artificial tooth formed with a cavity extending into it from its base, and with one or more lugs which project into said cavity, said lug, when formed by the mold, extending from the base of the tooth to the end or floor of said cavity, and then undercut before the tooth is fired, substantially as and for the purpose described.

In testimony whereof I affix my signature in presence of two witnesses.

MERRILL WEIR HOLLINGSWORTH.

Witnesses:
BANKS F. ROUSH,
ROBINSON L. VAILL.